United States Patent Office 2,870,645
Patented Jan. 27, 1959

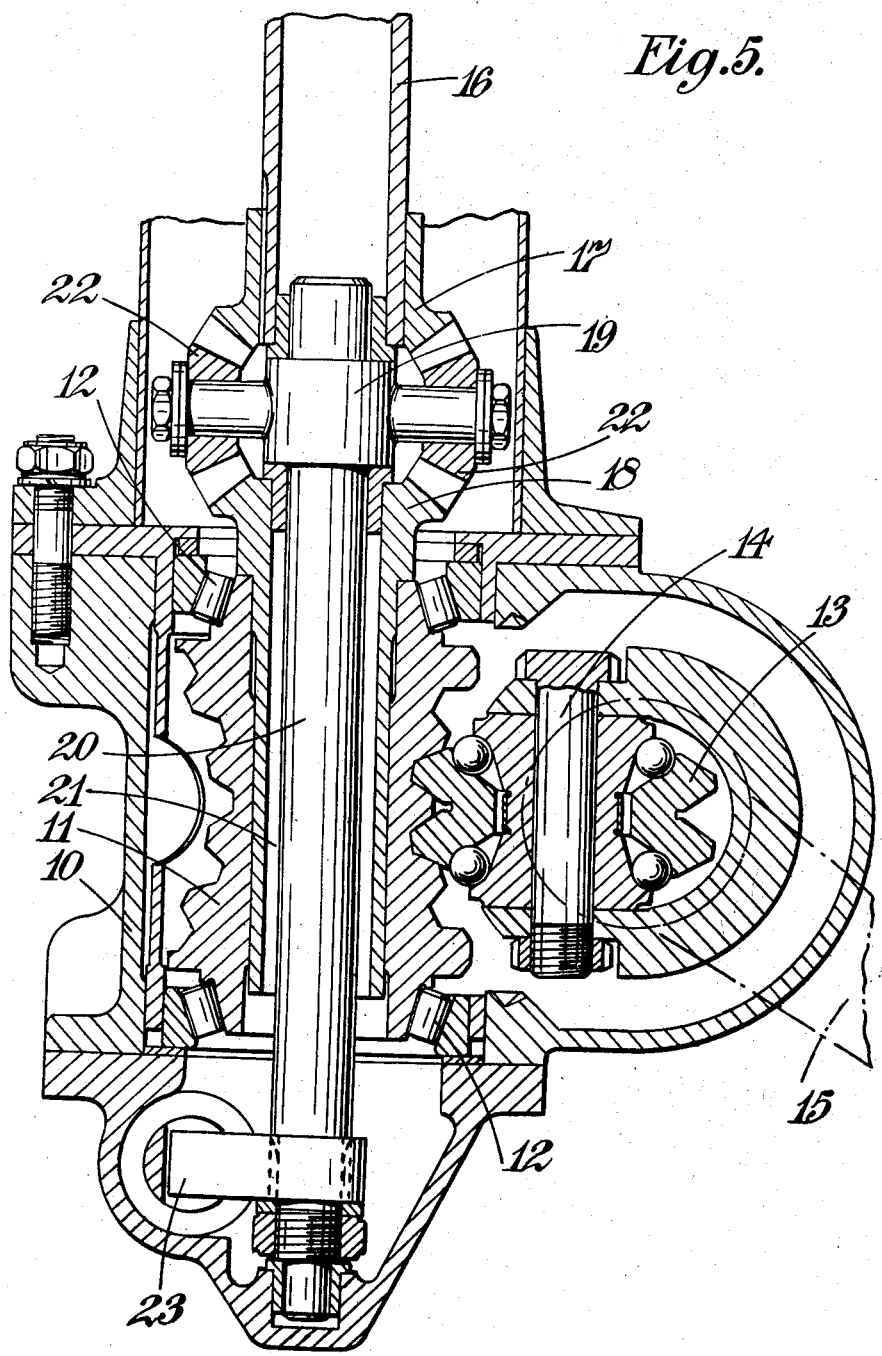

2,870,645

VEHICLE POWER STEERING APPARATUS

Frank Henry Tarlton, Winsford, England, assignor to Rolls-Royce Limited, Derby, England, a British company Application December 13, 1954, Serial No. 474,652

Claims priority, application Great Britain December 23, 1953

4 Claims. (Cl. 74—388)

This invention relates to vehicle steering apparatus and is concerned with apparatus of the kind which is commonly and hereinafter referred to as "power steering apparatus."

In apparatus of this kind it is common practice to utilise a fluid motor to assist in the steering action, the supply of the pressure fluid to the fluid motor being controlled by a control mechanism sensitive to loads arising in the steering apparatus in effecting the steering control, e. g. by means of the normal steering wheel of a road vehicle. In other arrangements of power steering apparatus, a mechanical source of power is used, e. g. the power may be derived from a friction drive, the control mechanism being arranged to control the introduction of power from this source into the steering apparatus.

The present invention is applicable to steering apparatus more particularly for road vehicles of the kind including a worm or equivalent element which is rotated by the steering control member, such as the steering wheel of a motor vehicle, and engaged by an element which is connected through linkage to road wheels or the like. Various forms of steering apparatus of this kind are well-known including those comprising a worm gear engaged by a nut or cam device carrying a drop arm connected with the linkage referred to, those comprising a screw-threaded shaft of the steering control member engaging a nut externally thereof, the movement of the nut along the thread being transmitted to the steering linkage, and those comprising a pinion device on the steering control member engaging a rack element connected with the steering linkage. The invention is particularly, though not exclusively, applicable to such forms of steering mechanisms.

According to the present invention, in power steering apparatus of the kind comprising a rotatable worm or equivalent arranged to be driven in rotation by a rotatable steering control member, power input means adapted to supply power to assist steering, and a control mechanism to control the power supply, a gear mechanism is connected to transmit steering torque between the worm or equivalent and the steering control member, said gear mechanism including parts between which relative movement arises in torque transmission, and the power control mechanism is connected to be operated by the said relative movement between the parts of the gear mechanism being transmitted through operating means which extend through a hollow formation internally of the worm or equivalent. The power control mechanism may be supported on structure associated with the bearing support of the worm or equivalent; for example it may be carried directly adjacent that end of the worm or equivalent, which is remote from the gear mechanism, or other convenient locations may be chosen, there being a suitable linkage or equivalent connection between the operating means and the power control mechanism.

In one preferred embodiment of the invention, the steering control member and the rotatable worm or equivalent are arranged coaxially with one another, and the gear mechanism is in the form of a differential gear of the planetary bevel type having a planet carrier provided with a shaft extending coaxially through the worm or equivalent; in such an arrangement the rotation of the planet carrier which results from the transmission of steering torque from the steering control member to the worm or equivalent, is transmitted through the planet carrier shaft to actuate the power control mechanism.

In another preferred embodiment of the invention the axis of rotation of the steering control member is off-set from the axis of rotation of the worm or equivalent, the gear mechanism comprises internally and externally toothed meshing gears, the arrangement being such that transmission of steering torque through the gear mechanism results in a reaction force to displace the gear element associated with the steering control member, and the operating mechanism comprises a lever device connected to the internally and externally toothed gears to rock on relative displacement of these gears and extending through a hollow formation within the worm or equivalent to actuate power control mechanism.

In preferred embodiments of the invention such as described above the actual displacement of the power control mechanism, e. g. a hydraulic valve, may be proportional to the reaction torque or force applied to the valve or equivalent; for example a valve may be hydraulically or spring-loaded to yield to an extent proportional to the reaction torque or force. In certain cases a hydraulically-loaded valve may be additionally loaded by means of a spring whereby a pre-selected displacement of the valve is obtained in accordance with the applied reaction torque or force.

Arrangements according to preferred embodiments of the invention present the advantage of compactness of installation, avoiding major changes in adapting existing steering apparatus to power steering requirements. A further advantage of arrangements according to the invention is that the power control mechanism may be mounted remotely from the steering column or tube in a road vehicle, preferably on rubber or other noise-damping material, whereby transmission of noise to the interior of the vehicle may be reduced.

Two preferred embodiments of the invention will now be described with reference to the accompanying drawings in which:

Figure 5 is a view corresponding to Figure 2 of a second embodiment.

Figure 1:
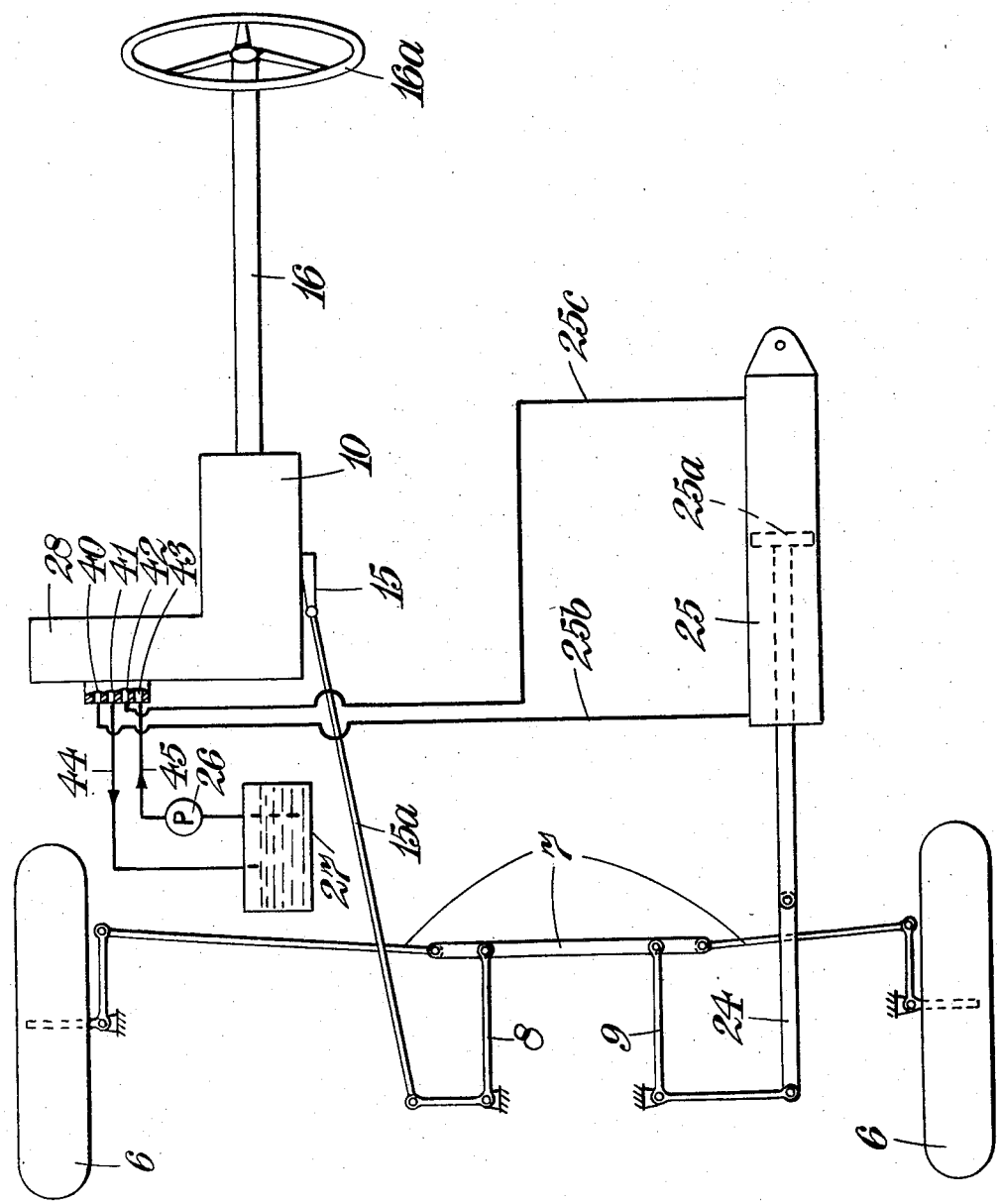
Figure 1 illustrates a form of power assisted steering apparatus.

Referring first to Figure 1, there is illustrated diagrammatically a form of power-assisted steering apparatus for vehicle wheels 6. The wheels are interconnected by a linkage 7 of which one element is pivoted to two bell-cranks 8, 9 of which bell-crank 8 is connected to a drop arm 15 through link 15a.

The drop arm 15 is carried by the steering box which comprises (Figures 1, 2, 3 and 5) a casing structure 10 accommodating in known manner a worm wheel 11 which is borne in the casing structure by thrust and journal bearings 12. The worm wheel 11 is engaged by a cam element 13, rotatable on axis 14 mounted in a shaft member 14a which in turn is mounted in bearings 14b in the steering box casing 10 to swing about an axis at right angles to the worm wheel axis. The shaft member 14a is splined at one end 14c and carries at this end the drop arm 15.

There is also provided a tubular steering control shaft 16 rotatable manually by the normal steering wheel 16a.

The bell-crank 9 is connected by a link 24 (Figure 1) to the piston 25a of a hydraulic motor 25. The latter is supplied with operating pressure oil by a pump 26 from a tank or sump 27. The pressure oil is delivered to one end or the other of the motor 25 through pipes 25b, 25c, under control of a valve 28 which is actuated as described below from the steering box.

The valve 28 may be mounted on the steering box either directly or through noise-reflecting connections.

Figure 2:
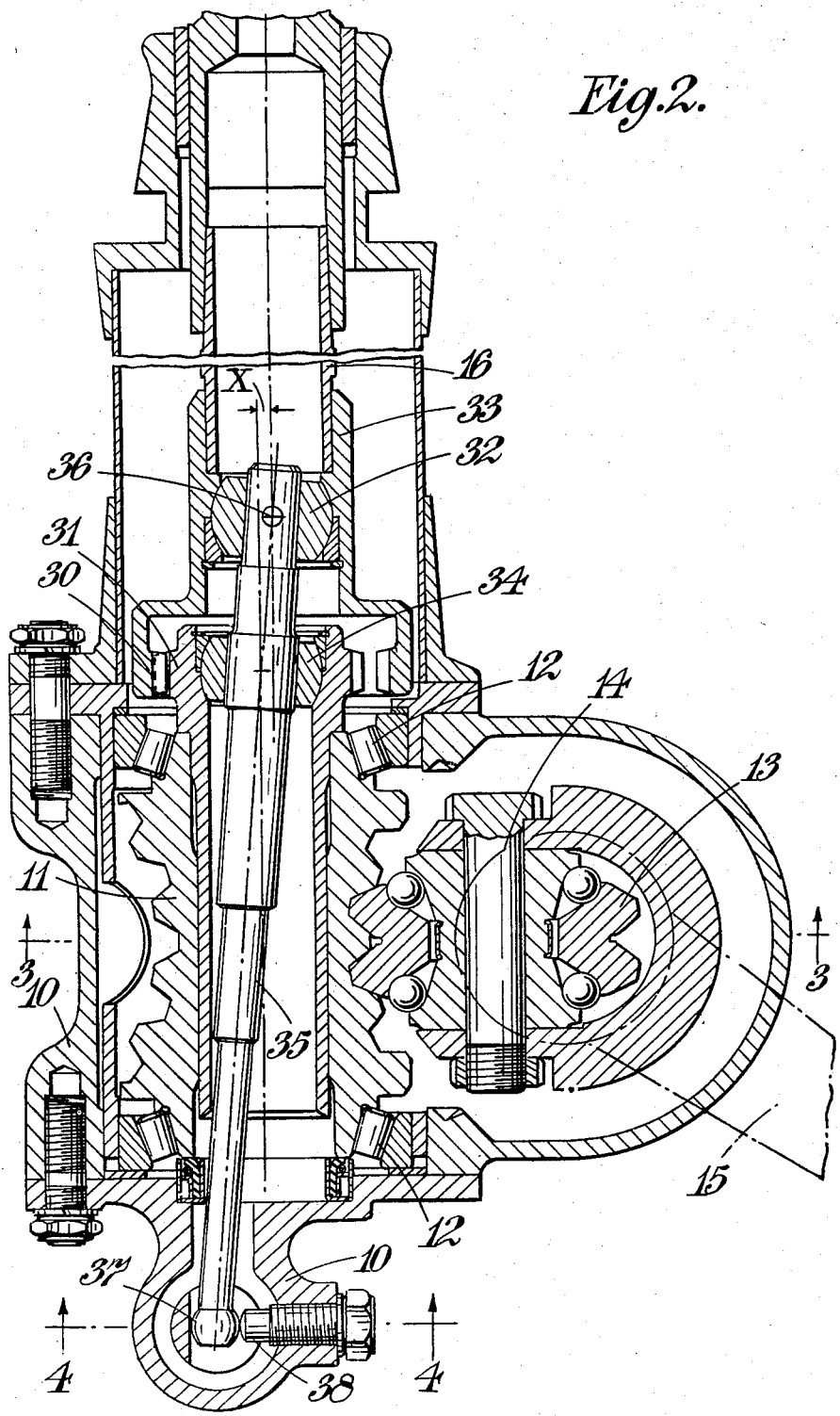
Figure 2 illustrates in detail one embodiment of the invention as applied to the form of steering apparatus of Figure 1.
Figure 3:
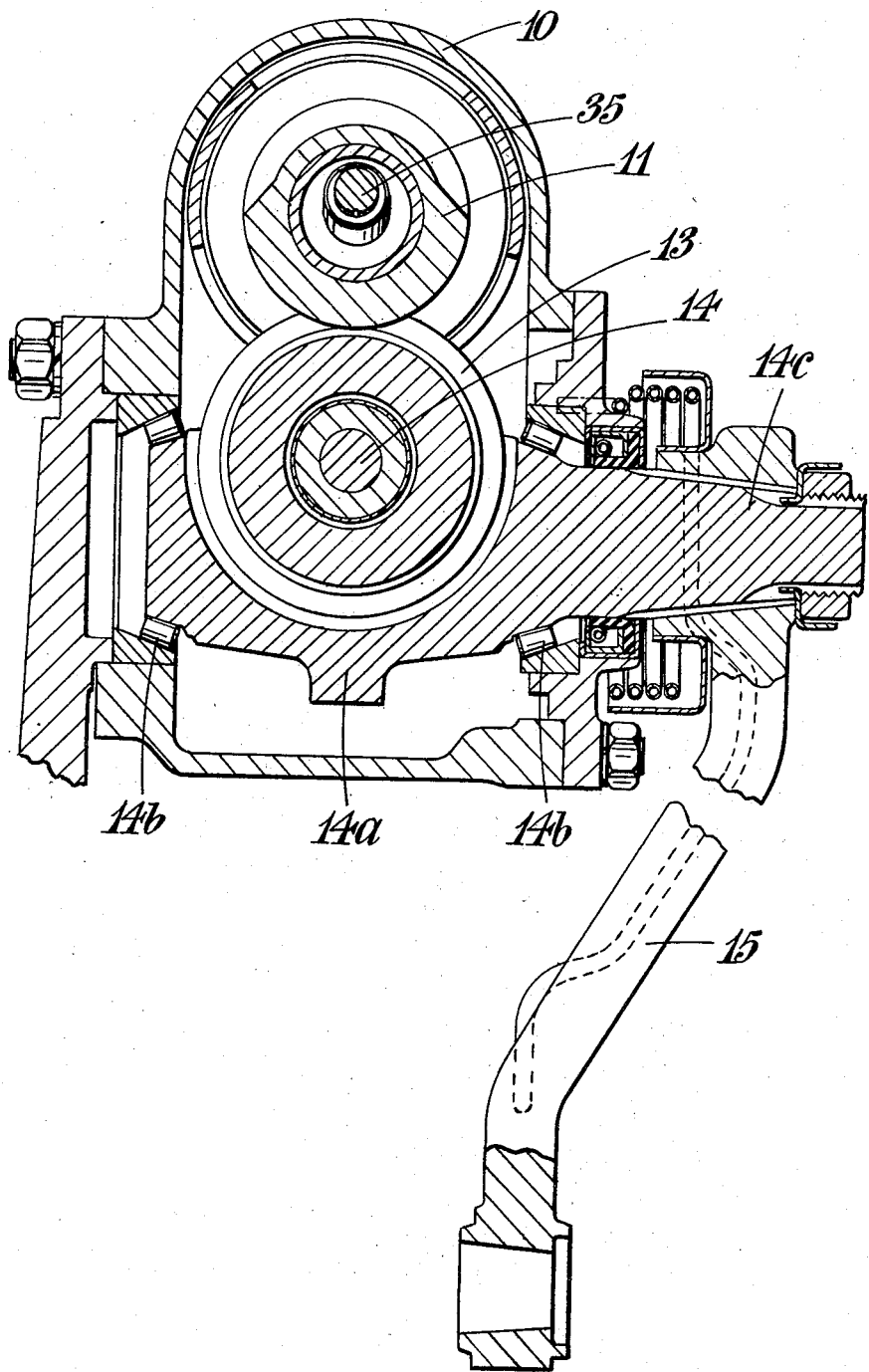
Figure 3 is a section on the line 3—3 of Figure 2.
Figure 4:
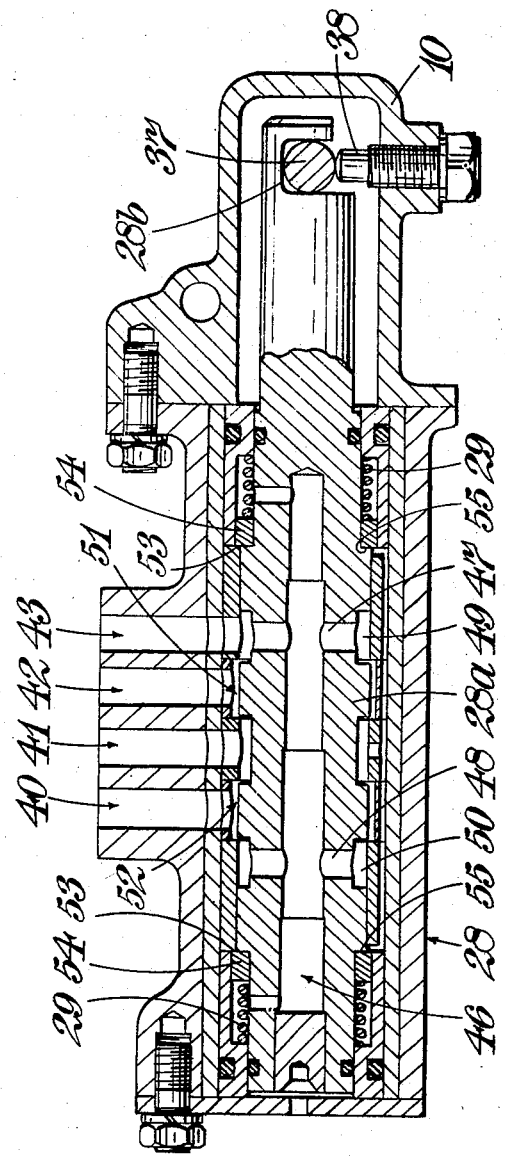
Figure 4 is a section on the line 4—4 of Figure 2.

Referring now to Figures 2 to 4, the steering tube 16 is connected to the wormwheel 11 and to the movable member 28a of the valve 28 to operate it in the following way. The steering tube 16 has secured to it an internally toothed gear element 30 and the worm wheel 11 has secured to it an externally toothed gear element 31. The axis of rotation of the steering tube 16 is slightly off-set from but is parallel to the axis of rotation of the worm wheel 11, as illustrated at x.

A part-spherical universal bearing element 32 is carried within a part-spherical socket formed in a cylindrical extension 33 of the gear element 30, and a similar part-spherical universal bearing element 34 is supported within a part-spherical socket in the externally toothed gear element 31. The part-spherical bearing elements 32 and 34 are axially bored to receive a lever 35 which is retained axially with respect to the bearing element 32 by a transverse pin 36. At its end remote from the gears 30, 31 the lever 35 has a part-spherical formation 37 which bears on the suitably shaped end of a reaction stop 38 which is screwed into the structure 10. The reaction member 38 can be set by means of the screw thread to determine the meshing engagement of the gear elements 30 and 31. The part spherical formation 37 of the lever 35 is also received in a notch 28b in the valve member 28a which (Figure 4) is resiliently loaded by springs 29 to a central zero position.

In this arrangement deflection of the gear elements 30 and 31 arising in the transmission of steering torque therethrough results in rocking of the lever 35 to move the valve member 28a to the right or left from the position of Figure 4, and thereby to control the supply of hydraulic fluid to the hydraulic motor 25. This deflection is due to the tangential force arising between the two gear elements 30, 31 in transmitting the steering torque, resulting in yielding of the internally toothed gear 30 relative to the externally toothed gear 31, the latter being firmly located in the box structure 10 through the bearings 12 whilst the former is located only by a bearing remote from the gear 30. This results in the rocking of the lever 35 in the lateral sense. The reaction stop 38 is suitably shaped to ensure that the meshing of the gears is correct for all displacements of the lever 35.

Referring now to Figure 5, the rotational movement of the shaft 16 is transmitted to the worm wheel 11 through a form of differential gear comprising a bevel sun gear 17 keyed on the shaft 16 and a bevel sun gear 18 connected to rotate with the worm 11. The gear mechanism further comprises a cage or planet carrier 19 having a shaft extension 20 extending through a bore 21 in the worm 11. The carrier 19 supports the bevel planet gears 22 meshing with bevel sun gears 18 and 19.

The rotational movement of the steering tube 16 is thus transmitted to the worm 11 when the cage 19 is restrained against rotation. This restraint is achieved as follows. A lever arm 23 is splined to the shaft extension 20 at its end remote from the differential gear mechanism, and the arm 23 is arranged to actuate the movable valve member 28a by engaging a notch in it. When torque is imposed in the shaft extension 20 through reaction occurring in the gear mechanism, the valve member 28a is moved in one sense or the other against the resilient restraint of springs 29 thereby to control the pressure of hydraulic fluid to hydraulic motor means 25 introducing power into the steering apparatus in any known or convenient manner.

Although reference has been made to the arm 23 and lever 35 actuating directly the valve member 28a, a suitable linkage may be used between the parts.

Referring now to Figure 4, there is shown a known form of hydraulic control valve 28 as used in steering apparatus. The valve comprises a casing with a series of four ports 40, 41, 42, 43, of which port 40 is connected with pipe line 25b, port 41 is connected by pipe line 44 to the reservoir 27, port 42 is connected to pipe line 25c, and port 43 is connected by pipe line 46 to the delivery side of pump 26.

The movable valve member 28a has a longitudinal bore 46 closed at each end and cross bores 47, 48 leading to annular grooves 49, 50 respectively in its surface. The groove 49 receives pressure oil from the port 43 and slightly overlaps one edge of an annular channel 51 in the casing communicating with port 42. The groove 50 slightly overlaps one edge of an annular channel 52 communicating with port 40. The member 28a has a further groove 53 which overlaps slightly the other edges of the channels 51, 52.

The casing is lined with sleeves and the sleeves are arranged to afford oppositely-facing shoulders 53 for thrust rings 54 against which the springs 29 bear and the member 28a has corresponding shoulders 55.

With valve member 28a in the central position, there is a continuous leak from port 43 to port 41 through the channels 51, 52, and the restriction of the two leakage paths are equal so the pressures on each side of the piston 25a are equal.

On movement of the member 28a to one side or the other through the lever head 37 or arm 23 as above described, which movement is opposed to displacement by one of the thrust rings 54, the one of the channels 51, 52 is gradually cut off from port 43 and the other is gradually cut off from the port 41 so that the pressure at one side of the piston 25a increases and the pressure at the other side decreases so operating the steering motor 25. The thrust ring 54 which is not displaced remains against its shoulder 53.

I claim:

1. In a vehicle steering apparatus of the class comprising a manually-rotatable steering shaft and power means to assist steering forces applied through the shaft; an internally-toothed gear and a meshing externally-toothed gear, said gears having their axes of rotation off-set from one another, whereof one of said gears is connected to be driven by the steering shaft and affords an input member, said input member being adapted to be displaced on transmission of torque by said gears, and whereof the other of said gears is hollow and affords an output member; a second gear mechanism comprising a first and hollow gear element having said output gear member secured coaxially thereto at one end whereby the output gear member and the first gear element rotate together, and a second gear element connected to be driven by rotation of said first gear element and adapted to transmit steering forces; a movable power supply control element adapted to control power supply by said power means, said control element being movably mounted beyond the opposite end of said first gear element; and a lever pivoted at a point intermediate its ends and extending through the hollow output member and the hollow first gear element, said lever being connected at one end to the input member to be moved on movement of said input member and connected at its opposite end to said control element to effect power supply controlling movement thereof.

2. A vehicle steering apparatus as claimed in claim 1, comprising also a first ball and socket connection connecting said end of the lever to the input member and having its centre on the axis of rotation of the input member, and a second ball and socket connection connecting said lever at a point between its end to the output member and having its centre on the axis of rotation of the output member.

3. A vehicle steering apparatus as claimed in claim 2, having said opposite end of the lever part-spherical, and further comprising a reaction stop engaged by said part-spherical end of the lever, said reaction stop being shaped to maintain the input and output members in desired mesh during displacement of the input member.

4. In a vehicle steering apparatus of the class comprising a steerable member, a manually-rotatable steering shaft connected to steer said steerable member and power means connected to the steerable member to assist steering forces applied through the shaft to the steerable member; means connecting the shaft and the steerable member and controlling the power means comprising a hollow gear element in line with and extending axially from the end of the shaft, a gear mechanism disposed between and interconnecting the shaft and the hollow gear element to transmit torque to the hollow gear element from the shaft, said gear mechanism including an internally toothed gear and a meshing externally toothed gear, said gears having their axes of rotation offset from one another, whereof one of said gears is mounted on the end of the steering shaft and the other of said gears is secured to rotate with the hollow gear element, said gear mounted on the shaft being displaceable due to torque reaction arising in torque transmission through the gear mechanism, a toothed member meshing with said hollow gear element to be moved thereby on rotation of the hollow gear element and being connected with the steerable member to transmit thereto steering forces applied manually to the steering shaft, a movable power supply control element adapted to control power supplied by said power means, said control element being movably mounted beyond the end of the hollow gear element remote from the steering shaft, means resiliently opposing movement of the control element, and a lever pivoted at a point intermediate its ends to the gear which is secured to rotate with the hollow gear element, said lever extending through the hollow gear element and being connected at one end to said one of the gears which is secured on the steering shaft to be moved by said movement due to torque reaction, and said lever being connected at its opposite end to said control element to move it against the action of said means resiliently opposing movement of the control element.

References Cited in the file of this patent

UNITED STATES PATENTS

| | | |
|---|---|---|
| 2,077,747 | Edmondson | Apr. 20, 1937 |
| 2,311,010 | Vickers | Feb. 16, 1943 |
| 2,650,669 | Hammond | Sept. 1, 1953 |